United States Patent [19]
Schuepstuhl et al.

[11] Patent Number: 5,624,309
[45] Date of Patent: Apr. 29, 1997

[54] FUME REMOVAL WORK STATION

[76] Inventors: Karl H. Schuepstuhl, 5369 Walker Rd., Stone Mountain, Ga. 30088; Michael A. Wegner, 3202 Cloudland Ct., Buford, Ga. 30519

[21] Appl. No.: 529,311

[22] Filed: Sep. 18, 1995

[51] Int. Cl.⁶ .................................................. B08B 15/04
[52] U.S. Cl. ............................................. 454/66; 454/49
[58] Field of Search .................. 454/49, 63, 65, 454/66, 67

[56] References Cited

U.S. PATENT DOCUMENTS

| | | | |
|---|---|---|---|
| 3,807,148 | 4/1974 | Fike et al. | 454/49 X |
| 3,880,061 | 4/1975 | Hensiek et al. | 454/66 |
| 4,821,704 | 4/1989 | Tucker et al. | 454/49 X |

FOREIGN PATENT DOCUMENTS

| | | | |
|---|---|---|---|
| 2-146441 | 6/1990 | Japan | 454/49 |
| 2-14341 | 6/1990 | Japan | 454/49 |
| 89/11929 | 12/1989 | WIPO | 454/66 |

OTHER PUBLICATIONS

"The Power in Purification", Impell Fume Filter System Series 1200 (undated).

"The Power in Purification", Impell Air Purification Systems Series F3000(undated).

*Industrial Ventilation*, 20th Ed., 1988, page containing Fig. 1–10, pp. 3–18, 3–19, 10–66, 10–67.

"The Power in Purification", Impell Exhaust Arms and Nozzles (undated).

*Primary Examiner*—Harold Joyce
*Attorney, Agent, or Firm*—Kennedy, Davis & Kennedy

[57] ABSTRACT

A work station comprising a portable platform defining a work area for soldering and desoldering operations for electrical/electronic components with fume removal and reduced build-up of static electricity by providing a conductive surface in the work area connected to a ground and an air extraction plenum on the back side of the platform which communicates fumes from the work area to a vent. The fan communicates with the air extraction plenum to induce a negative pressure around a face side of the plenum for moving air and fumes through intake slots into the plenum. Nozzles mounted on a front side of the platform direct low pressure air flowing at a rate of one to four cubic feet per minute across the work station towards to the facing side of the plenum. A method of removing solder fumes is disclosed.

10 Claims, 1 Drawing Sheet

FUME REMOVAL WORK STATION

TECHNICAL FIELD

The present invention relates generally to work stations for electronics manufacturing. More particularly, the present invention relates to a work station that removes solder fumes while providing a static-free work area for electronics manufacture.

BACKGROUND OF THE INVENTION

Manufacturing processes often generate noxious fumes during processing. These fumes are typically unwanted but inherent bi-products of the manufacturing process. For example, solvent fumes are typically emitted from baths used for washing metal parts. Manufacturing of electrical components and electronic circuit boards also creates noxious fumes which arise from the soldering activities of attaching and detaching electrical components in devices such as relays, power supplies, and the like, and electronic components to circuit boards. The fumes generated by soldering or desoldering of electrical/electronic components are at the very least an irritant to the worker. High concentrations of these fumes may cause illness. Government regulations require removal and venting of the fumes to protect workers.

Devices have been provided for removal of these fumes from the work place. One device uses a vacuum to extract fumes from soldering work areas and to pass the fumes through a filter. The fume filter includes a pleated pre-filter for removal of large particulates, a HEPA filter for removing particles down to about 0.3 micron, and an activated carbon filter for removal of volatile compounds and odors in the fumes. The vacuum and filter device connects through hoses to articulatable arms that mount adjacent the work stations. The arms comprise pivotally interconnected tubes with nozzles attached to distal ends. The nozzles typically are elongated tubes having a slit for communicating the fumes to the filter, although cylindrical nozzles and funnel nozzles are known. The worker soldering electronic components moves the articulatable arm to position the nozzle within a proximal area of the solder work. The vacuum apparatus induces a suction through the nozzle for pulling the solder fumes in the general area of the nozzle into the tube and to the filter apparatus.

Other fume removal devices attach a suction nozzle to the soldering iron adjacent the heating tip. The inlet of this vacuum device is thereby positioned adjacent the primary source of the solder fumes. A portion of the fumes however escape to the atmosphere.

While these devices have accomplished the purpose of removing some of the solder fumes from work stations, there are problems associated with their use. In particular, stand-alone vacuum devices require powerful motors to facilitate connection of lengths of tubes for multiple work stations. The removal of the solder fumes by the exhaust arms in the work areas is limited in the range of extraction due to the suction limitations of the vacuum devices. Typically the vacuums have relatively low suction pressures and therefore are capable of effecting removal of solder fumes from a limited area. As discussed below, low suction is required to reduce build-up of static electricity in the work area. As the worker places components on various parts of the circuit board, the distal portions of the work area away from the location of the nozzle may insufficiently experience the suction effects from the nozzle. Accordingly, some fumes are not collected and as a consequence, the worker must stop work and reposition the nozzle as the work progresses over the circuit board in the work area.

There are also drawbacks with placing the vacuum nozzle on the soldering iron. While the nozzle adjacent the heating tip provides recovery from the primary source of solder fumes, the heating tip is being continually cooled. This increases the time required to effect a solder joint. Also, the soldering iron is more bulky and with the suction hose is more difficult to handle than a soldering iron without such vacuum system. The suction hose in this device typically is of small diameter and tends to clog easily which reduces the effectiveness of removing solder fumes.

In addition to the need to remove and filter solder fumes, electronics manufacture also has a need to control or eliminate the problem of static electricity built-up in the work area. Assembling electronic components requires static-free environments in order to avoid the damaging effects on electronic components by discharge of static electricity which may destroy components such as IC chips and the like. Static electricity is created in a variety of ways. Air movement itself across a work area may create a build-up of static electricity. Air blowing on worker's hands can also create discomfort for the worker. Thus the suction in vacuum devices can not be so great as to induce significant air currents across the work area. The clothing and the body of workers also can create, hold, and discharge static electricity into electronic components. To reduce the risk of build-up and discharge of static electricity, workers are often electrically grounded to the work stations by ground straps.

It is thus seen that a need exists for an improved work station for removal of fumes while controlling build-up of static electricity. It is to the provision of such that the present invention is primarily directed.

SUMMARY OF THE PRESENT INVENTION

The present invention meets the need in the art for a work station for removing solder fumes and discharging static electricity build-up from a work area for soldering and desoldering operations, comprising a platform with an air extraction plenum that extends upwardly from a backside of the platform for communicating fumes from at least one intake slot in the side of the plenum facing the work area to a vent from which the fumes are discharged. An air transfer cavity adjacent the facing side of the plenum is defined by a back, a pair of opposing lateral sides, and a top. Means are provided for creating a negative air pressure flow in the air transfer cavity into the air extraction plenum. A pair of spaced apart nozzles connect to a supply of low pressure air flowing at a rate of about one to about four cubic feet per minute. The nozzles mount on elevated stanchions on a front side of the platform to discharge air towards the front side of the plenum. The low pressure air flows across the work station towards the air plenum and carries the solder fumes into the air transfer cavity. The air and fumes in the air transfer cavity are thereafter moved by the negative pressure suction through the slots into the air extraction plenum for discharge through the vent. In a preferred embodiment, the platform includes a conductive surface that connects to a ground for discharging static electricity from the work area.

The method of the present invention provides a platform for a work area for electrical/electronics manufacture involving soldering and desoldering operations, from which solder fumes are removed. A supply of low pressure air is directed to flow at a rate of about one to four cubic feet per minute from nozzles across the work area towards an air transfer cavity adjacent an air plenum having open slots for receiving air therethrough. A negative pressure air flow created in the air plenum communicates air from the plenum to a discharge vent and thereby induces a negative pressure air flow from an air transfer cavity that is defined by an overhanging top and side wall extending from the air plenum towards the work area. The air transfer cavity entraps solder fumes directed by the supply of low pressure air towards the air plenum, until the air mass containing the fumes moves through the slots into the air plenum. The method further discharges static electricity built-up in the work area to a common ground.

DETAILED DESCRIPTION

Figure 1:
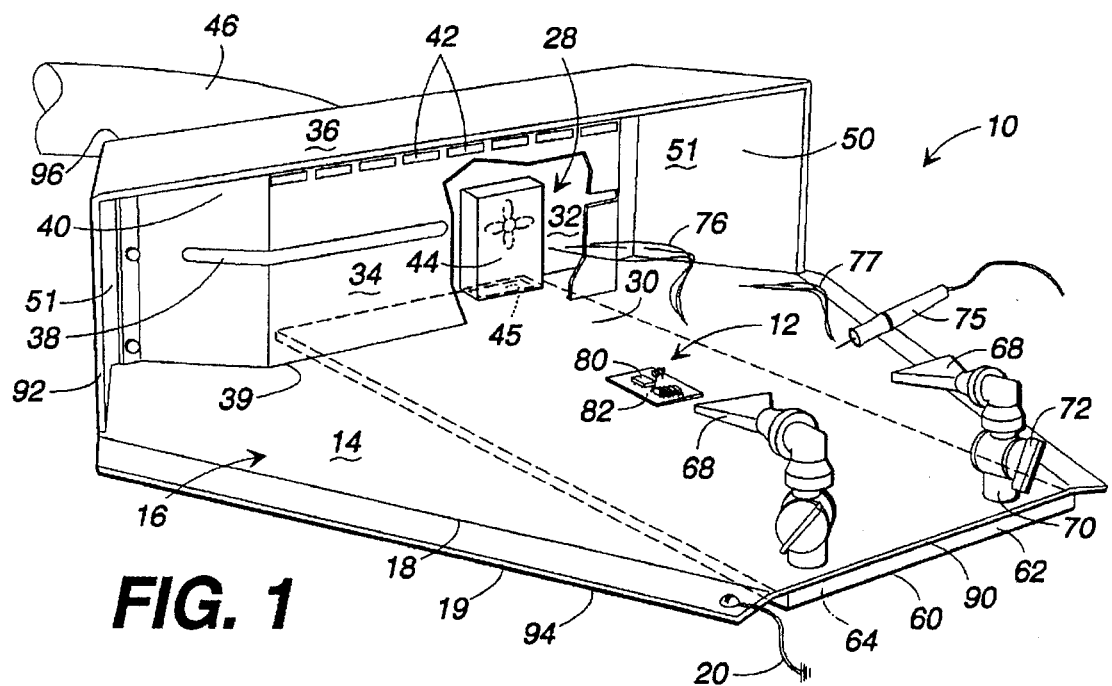
FIG. 1 is a perspective view of a work station for fume removal and discharge of static electricity build up from a work area according to the present invention.

Referring now in more detail to the drawings in which like parts have like reference numerals, there is illustrated in perspective view a work station 10 according to the present invention for removing process solder fumes from a work area generally designated 12 for working on circuit boards. In a preferred embodiment, the work station 10 further provides for discharge of static electricity from the work area 12. The work area 12 comprises a platform 14 having an upper surface 16 for supporting the circuit board to be assembled. In a preferred embodiment, the surface 16 is defined by a conductive sheet 18 which adheres to a base 19. A ground strap 20 connects at a first end with a screw to the conductive sheet 18 and the base 19 and at a distal end to a common ground. Portions (not illustrated) of the ground strap 20 include a conventional wrist band and clips for connecting the worker, clothes, and the electronic boards to the ground so that there will be no difference in ground potential.

An air extraction plenum 28 extends upwardly from a rear portion 30 of the platform 14. The air extraction plenum 28 comprises a substantially closed housing having a back wall 32 and a front wall 34 that faces the work area 12. The platform 14 forms the bottom of the plenum 28 and a top 36 closes the upper end of the plenum. The front wall 34 defines at least one narrow elongated slot 38 for communicating air from adjacent the plenum 28 into the interior of the plenum. In the illustrated embodiment, there are two longitudinal elongated slots 38 in the front wall 34. The slots 38 are disposed medial the lower edge 39 and the upper edge 40 of the plenum 28. Further, a plurality of openings 42 are defined along the upper edge 40 of the front wall 34, for a purpose to be discussed below.

A blower 44 or fan mounts to the back wall 32 of the plenum 28 and communicates with an opening 45 in the platform 14 within the plenum 28, for a purpose discussed below. A hose 46 connects to a discharge tube 48 (best illustrated in FIG. 2) on the back of the plenum 28 and communicates with a vent for discharge of air and fumes from the plenum.

An air transfer cavity generally designated 50 is defined adjacent the front wall 34 of the plenum 28 by a pair of opposing lateral sides 51 that in the illustrated embodiment are integral with the top 36. The top 36 and the side walls 51 extend laterally from the front wall 34 towards the work area 12 to define a cantilever overhanging cover and sides of the cavity 50.

A plate 60 mounted below the platform 14 with side and end walls generally designated 62 define an air passageway 64 that extends from the backside of the platform 14 to the front side. The passageway 64 communicates through the opening 45 with the fan 44 for inducing pressurized air into the passageway. A pair of nozzles 68 connect to tubular stanchions 70 which are in communication with the passageway 64. Rotatable valves 72 in the stanchions 70 permit selective control of the air flow through the nozzles 68. The stanchions 70 dispose the nozzles in a plane substantially aligned with the slots 38.

In a preferred embodiment, the work station 10 is fabricated from 16 gauge steel and the conductive sheet 18 is an adhesive-backed fiber sheeting applied to the platform 14. The work station 10 illustrated in FIG. 1 is portable to accommodate changes in production line layouts at electronics manufacturers. In the illustrated embodiment, the front edge 90 of the platform 14 is 12 inches wide and the depth of the work area 12 is 17 inches from the front edge 90 to the face edge 92 of the sides 51 and top 36. The side edges 94 taper outwardly to the face edge 92 where the width of the work station 10 is 26 inches. The sides 51 taper slightly inwardly to define a back edge 96 with a width of 22 inches. The air transfer cavity 50 has a depth of 5 inches and a height of 6 inches. The air plenum has a depth of about 2 inches. The slots 38 are ⅜ inch by 8½ inches long. The openings 42 are ⅜ inch by 1½ inches. The air passageway 64 has a height of ¼ inch.

Figure 2:
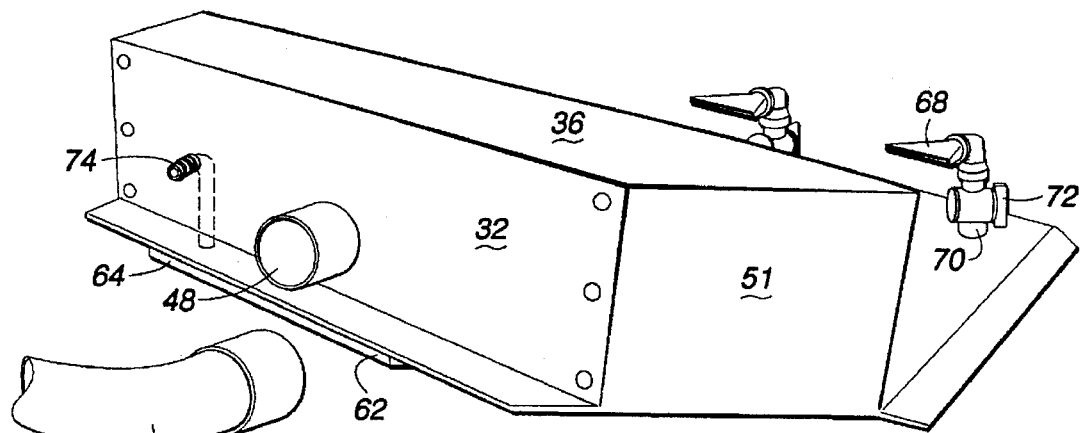
FIG. 2 is a perspective view of a back of an alternate embodiment of the work station illustrated in FIG. 1.

FIG. 2 illustrates a perspective view of an alternate embodiment of the work station 10 having a duct 74 that couples to a low pressure air supply, for a purpose discussed below. The duct 74 communicates with the passageway 64. The hose 46 is exploded away from the discharge tube 48 for purposes of illustration. The hose 46 preferably connects to a vacuum and filter device for recovering and treating the solder fumes. In an alternate embodiment (not illustrated) the work station 10 is a portable, stand-alone apparatus having a fan and filter apparatus attached to the tube 48. In an alternate embodiment (not illustrated), a fan and filter apparatus mounts to the tube 48 for extracting air and fumes from the air plenum 28. A duct opens to the discharge side of this apparatus. A portion of the air under pressure from the fan is communicated through the duct to the passageway 64 for supplying the nozzles 68.

The work station 10 is used for soldering electronic components 80 during the assembly of electronic circuit boards 82 on the work area 12. The fan 44 is started which begins to draw air from outside the work area 12 and communicate the air with the passageway 64. In the embodiment illustrated in FIG. 2, the duct 74 connects to a source of low pressure air to supply the passageway 64. The pressurized air flows through the passageway 64 to the nozzles 68 which direct the air generally across the work area 12. The flow rate of about 1 to 4 cubic feet per minute is controlled by opening and closing the valves 72. Such flow rate is minimally perceptible on the exposed hands of a worker soldering components in the work area 12, yet is sufficient to induce the solder fumes to move laterally from the work area towards the air transfer cavity 50. The directed flow rate of about 1 to 4 cubic feet per minute will create air mass movement of about 20 to 30 cubic feet per minute which will carry the solder fumes into the air transfer cavity 50.

The suction pressure on the plenum 28 is commenced through the hose 46. As air is removed from the plenum 28, air within the air transfer cavity 50 is induced by the lower pressure to move through the slots 38 and the openings 42 into the plenum. In a preferred embodiment, the mass of air removed from the plenum is slightly greater than the mass of air induced to move by the low flow rate of air from the nozzles 68. In this way, the suction rate creates a slight negative pressure that tends to retain the solder fumes within the cavity 50 so that the fumes do not curl around the sides 51 or over the top 36. Fumes which rise in the cavity 50 move through the openings 42 near the top 36.

The worker then grounds himself with the grounding strap to electrically communicate with the work station 10. The electronic circuit board is then placed in the work area 12 and soldering with a soldering iron 75 commences. Solder 77 is brought into contact with the soldering iron 75 and fumes generally designated 76 are created. The low positive pressure air flow from the nozzles 68 direct the solder fumes in the direction of the air transfer cavity 50. In the preferred embodiment, the directed air flow of approximately one to about four cubic feet per minute across the work area generates a directed general air movement of approximately 20 to 30 cubic feet per minute towards the air transfer cavity 50. Such air flow rate is sufficient to redirect the solder fumes from naturally escaping upwardly from the work area, and slow enough to provide appropriate comfort levels for the hands of the worker, which are typically positioned in the work area subject to the directed air movement. The slow movement also avoids turbulence caused by the hands or other obstructions in the work area and which may negatively impact the redirecting of the solder fumes.

The fumes are communicated with the directed air into the transfer cavity 50. The opposing side walls 51 and the overhanging top 36 entrap the fumes within the cavity 50 and prevent escape of the fumes by natural rising until the air mass in the cavity 50 is removed by extraction through the slots 38 and the openings 42 in the front wall 34 of the plenum 28. In a preferred embodiment, the extraction capacity by the low volume air flow induced by the fan 44 is slightly greater than the volume of the general positive air pressure flow directed by the nozzles 68. The transfer cavity 50 prevents escape of the fumes due to the extracted air mass from the cavity 50 and the positive pressure directed air movement into the cavity being in an approximate air mass ratio of about one to one. Preferably, the extraction of air mass from the cavity 50 slightly exceeds the supply of air mass moved by the nozzles 68 in order to maintain a slightly negative or suction pressure through the slots 38 and 42 in the plenum 28. The worker can observe the communication of the fumes 76 from the work area 12 to the air plenum 28, and using the valves 72, adjust the velocity of the air flow from the nozzle 68.

The conductive sheet 18 and the grounding strap 20 maintain the worker, the work piece, and the work area at a common ground potential in order to avoid build up of static electricity and its harmful discharge into electronic components.

The foregoing is disclosed as an improved compact and portable work station for removal of fumes and elimination of static build up which damages electronic components. It should be understood that the above described embodiment merely illustrates principles of the invention in a preferred form. Many modifications, additions, and deletions, may of course, be made thereto without departure from the spirit and scope of the invention as set forth in the following claims.

What is claimed is:

1. A work station for removing solder fumes from a work area, comprising:

a platform that defines a work area;

an air extraction plenum extending upwardly from a back side of the platform for communicating fumes generated by soldering in the work area through at least one intake slot in a side of the air extraction plenum facing the work area to a vent from which the fumes are discharged;

an air transfer cavity adjacent the facing side of the air extraction plenum defined by a back, a pair of opposing lateral sides, and a overhanging top extending outwardly of the facing side of the air extraction plenum for entrapping the air and fumes therein until communicated into the air extraction plenum;

a pair of spaced-apart nozzles connected to a supply of low pressure air flowing at a first flow rate, said nozzles each mounted on respective elevated stanchions at a front portion of the work area opposite the air extraction plenum and defining outlets for discharging low pressure air towards the air extraction plenum, whereby the low pressure air induces flow of the solder fumes from the work area to the air extraction plenum; and means for creating a negative pressure air flow in the air transfer cavity at a second flow rate exceeding the first flow rate for inducing flow of air from the air transfer cavity through the air extraction plenum to the vent, whereby the mass of air removed from the air transfer cavity exceeds the mass of air moved by the flow of air from the nozzles for maintaining a slight negative pressure through the intake slot.

2. The work station for removing fumes as recited in claim 1, further comprising a conductive surface in the work area connected to a common ground for discharging static electricity from the work area.

3. The work station as recited in claim 1, wherein the means for negative pressure comprises a fan mounted to the plenum for moving air through the slot and into a discharge tube which connects to the vent for discharge of the fumes.

4. The work station as recited in claim 1, wherein the platform defines a passageway that communicates air from a supply to the nozzles.

5. The work station as recited in claim 4, wherein the passageway comprises a narrow gap between the platform and a plate attached to a lower surface of the platform.

6. The work station as recited in claim 1, wherein the means for negative pressure is a source of vacuum.

7. The work station as recited in claim 1, further comprising a valve that communicates with the nozzles for selectively setting the flow rate of air from the nozzles.

8. A method for removing solder fumes from a work area, comprising:

providing a platform that defines a work area for soldering and desoldering operations;

communicating a directed supply of low pressure air flowing at a rate of about one to four cubic feet per minute from nozzles across the work area towards an air plenum having open slots for receiving air therethrough;

creating a negative pressure air flow in the air plenum to communicate air from the plenum to a discharge vent and thereby inducing a negative pressure air flow from an air transfer cavity adjacent the air plenum, the air transfer cavity defined by an overhanging top and side wall extending from the air plenum towards the work area; and entrapping solder fumes directed by the supply of low pressure air towards the air plenum in the air transfer cavity, until the air mass containing the fumes moves through the slots into the air plenum.

9. The method as recited in claim 8 for removing solder fumes from a work area, further comprising discharging static electricity built-up in the work area to a common ground.

10. A work station for removing solder fumes from a work area, comprising:

a platform that defines a work area;

an air extraction plenum extending upwardly from a back side of the platform for communicating fumes generated by soldering in the work area through at least one intake slot in a side of the air extraction plenum facing the work area to a vent from which the fumes are discharged;

a pair of spaced-apart nozzles connected to a supply of low pressure air flowing at a first flow rate, said nozzles each mounted on respective elevated stanchions at a front portion of the work area opposite the air extraction plenum and defining outlets for discharging low pressure air towards the air extraction plenum, whereby the low pressure air induces flow of the solder fumes from the work area towards the air extraction plenum; and means for creating adjacent the air extraction plenum a negative pressure air flow at a second flow rate exceeding the first flow rate for inducing flow of air through the air extraction plenum to the vent, whereby the mass of air communicated through the air extraction plenum exceeds the mass of air moved by the flow of air from the nozzles for maintaining a slight negative pressure through the intake slot.

* * * * *